ELECTRONIC CIRCUIT

Filed Sept. 9, 1947 2 SHEETS—SHEET 1

INVENTOR
ROBERT M. BRINK
BY
ATTORNEY

Nov. 11, 1952 R. M. BRINK 2,617,858

ELECTRONIC CIRCUIT

Filed Sept. 9, 1947 2 SHEETS—SHEET 2

INVENTOR
ROBERT M. BRINK
BY
ATTORNEY

Patented Nov. 11, 1952 2,617,858

UNITED STATES PATENT OFFICE 2,617,858

ELECTRONIC CIRCUIT

Robert M. Brink, Pelham, N. Y., assignor to Deering Milliken Research Trust, New York, N. Y., a nonprofit trust of New York Application September 9, 1947, Serial No. 772,933

7 Claims. (Cl. 175—183)

The present invention relates to alternating current electrical circuits, more particularly to phase sensitive electrical circuits, and comprises a new circuit of this type which is not critical of adjustment and which yields a low frequency alternating current suitable for use in metering and control operations. The new phase sensitive or phase discriminator circuit makes it possible to obtain a low frequency signal the amplitude and polarity of which define the amplitude and polarity of a desired rectangular component of a higher frequency signal. Thus, the circuit can be advantageously employed, for example, as a means for analyzing an unknown impedance network, or, in conjunction with alternating current bridge networks, for measurement or control of one or both components of the signal current from the bridge.

In the phase discriminator circuit of the invention, energy from a source of reference voltage of a frequency equal to that of the signal to be analyzed is modulated in a balanced modulator with energy of the same low frequency as that to be delivered by the circuit. The higher frequency is then suppressed so as to leave only the side bands. When these side bands are mixed with the signal to be analyzed and the resulting envelope rectified, a component of the low frequency is present in the output. The amplitude of this component is proportional to the amplitude of the input signal which is in phase with, or in phase opposition to, the reference voltage; the polarity of the output signal changing with 180° change in phase of the component of the input signal. By shifting the phase of the signal through 90° before mixing with the side bands, a low frequency component corresponding in amplitude and polarity with the other rectangular component of the signal voltage is obtained.

Figure 1:
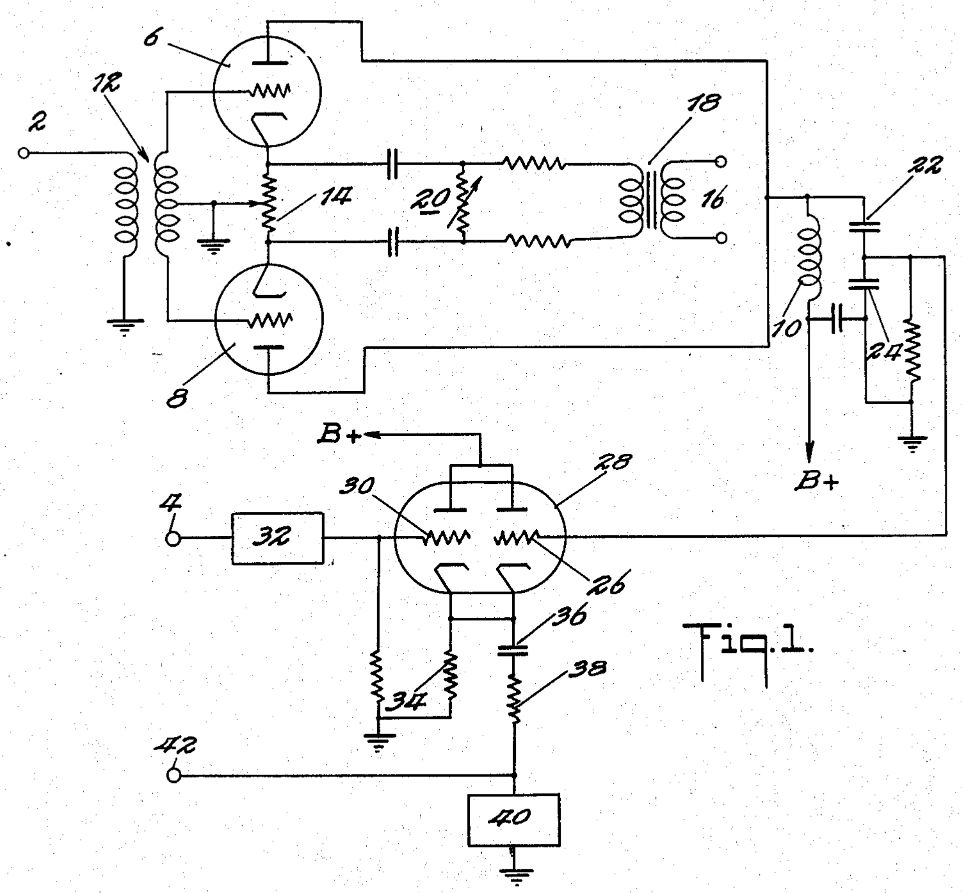
Figure 1A:
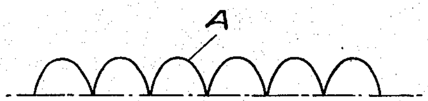
Figure 1B:
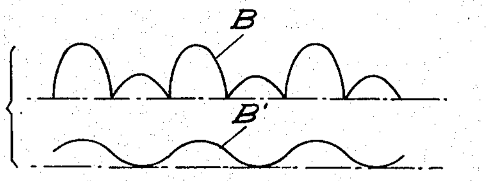
Figure 1C:
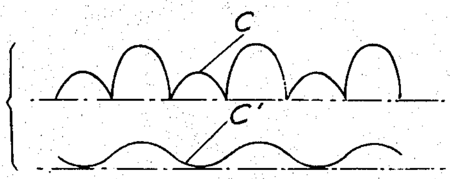
Figure 2:
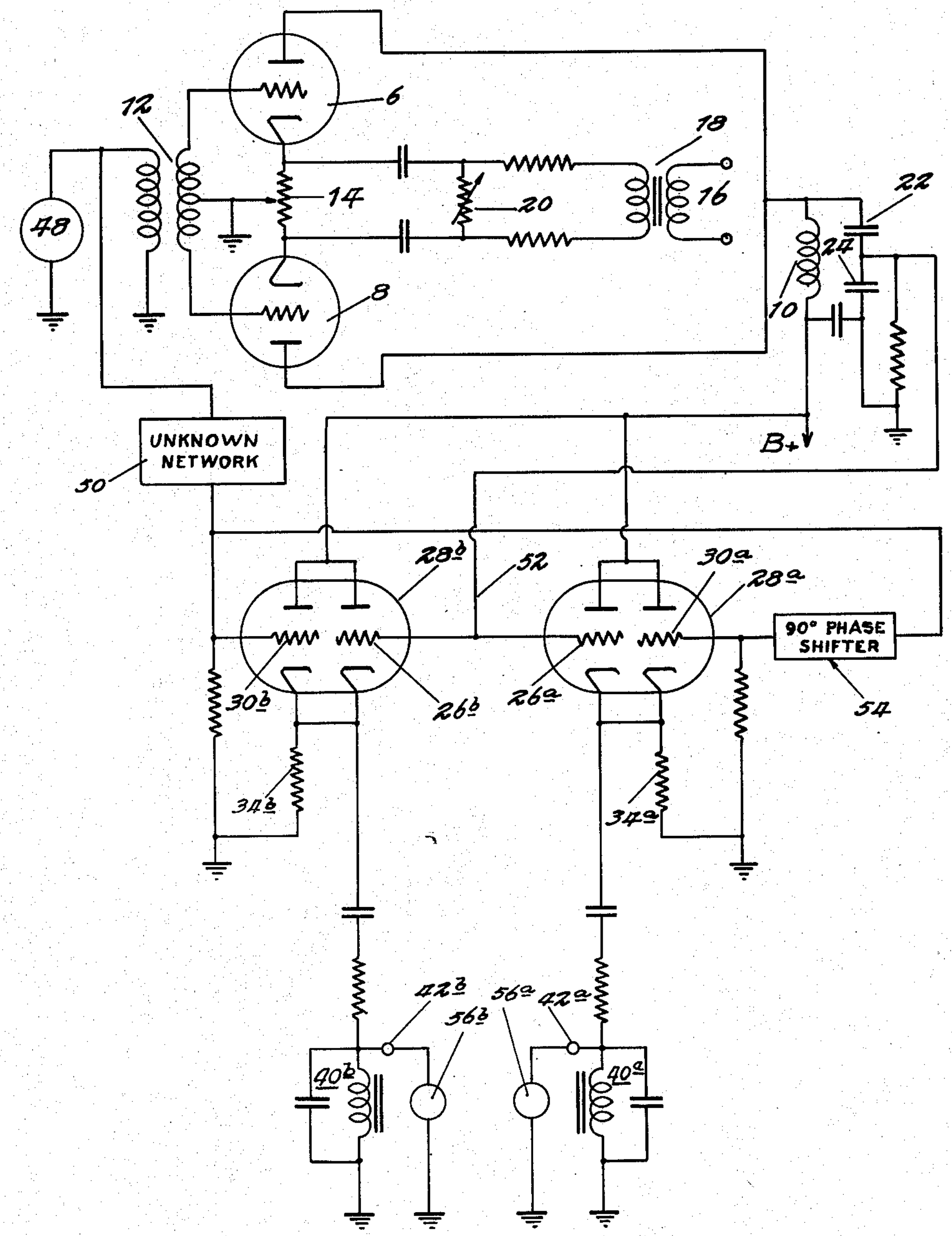

The invention will now be described with reference to the accompanying drawing of which:

Fig. 1 is a circuit diagram of a phase discriminator embodying the invention;

Figs. 1*a*, 1*b* and 1*c* are graphs explanatory of the operation of the circuit; and Fig. 2 is a circuit diagram illustrating a circuit of the type of Fig. 1 arranged for analysis of an unknown impedance network.

The circuit of Fig. 1 has two main input terminals, 2 and 4, the former for the high frequency reference energy and the latter for the unknown signal of the same frequency. The source of the high frequency signal and that of the reference energy have not been shown in the drawing, but it will be understood that either a common source would be provided or the sources would be synchronized so that the phase of one is fixed relative to that of the other. A balanced modulator for modulating the reference energy with low frequency energy is shown as comprising a pair of triodes 6 and 8, the anodes of which are tied together and connected to a source of positive potential, indicated as B+ through an inductance 10, and the grids of which are connected across a center grounded secondary winding of the input transformer 12. The cathodes of triodes 6 and 8 are connected together through a center grounded resistor 14 across which the modulating low frequency voltage is impressed. In the particular balanced modulator shown in Fig. 1 the modulating energy from any suitable source (not shown) is introduced at terminals 16 connected to the ends of the primary of a low frequency transformer 18; the secondary of which is connected, through a resistance capacity network 20, across the resistor 14. Series connected condensers 22 and 24, together with inductor 10, provide a resonant output circuit for the modulator. The junction of condenser 22 and 24 is connected to control grid 26 of a double triode 28, the other control grid 30 of which is connected through a phase shifting device 32 to input terminal 4. The cathodes of tube 28 are tied together and connected to ground through a resistor 34. The cathodes of tube 28 are also connected to a series circuit comprising a condenser 36, resistor 38 and low frequency filter 40; the junction of the resistor 38 and filter 40 being connected to the output terminal 42 of the discriminator. The constants of filter 40 should be such as to offer maximum impedance to current of the frequency of the modulating energy while by-passing from any circuit connected to the output terminal currents of twice such frequency.

With the above described circuit, energy of the frequency of the reference voltage impressed on terminal 2 will be eliminated from the output of the modulator leaving only the sideband energy created in modulation. If there is no signal at input terminal 4, the rectified output of tube 28 will have the general form indicated at "A" in Fig. 1*a* in which the pulsations are of twice the frequency of the modulating energy introduced at terminals 16. Current of this frequency will be by-passed by filter 40 and hence no output signal will appear at terminal 42. If now a signal of unknown phase and intensity and of the frequency of the reference voltage is applied to terminal 4, then the component of the signal energy which is 90° out of phase with the reference voltage will not affect the output from tube 28 but the component of the signal energy which is in phase with, or in phase opposition to, the reference voltage will introduce a component into the output circuit of a frequency of that of the modulating energy. This is graphically indicated in Figs. 1b and 1c wherein "B" of Fig. 1b represents the output from tube 28 when the signal component is in phase with the reference voltage and "C" of Fig. 1c represents the output from tube 28 when the signal component is 180° out of phase with the reference voltage. Curve B' of Fig. 1b represents the output signal appearing at terminal 42 after suppression by filter 40 of the component having a frequency twice that of the modulating energy, when the component of the input signal is in phase with the reference voltage and curve C', of Fig. 1c, 180° out of phase with curve B', represents the output signal at terminal 42 when the component of the input signal is 180° out of phase with the reference voltage. Thus when a high frequency signal is applied to terminal 4, a low frequency output signal will appear at the output terminal 42. The amplitude of such output signal will be proportional to the amplitude of one component of the input signal and its polarity will depend upon whether such input signal component is in phase with, or 180° out of phase with, the reference voltage.

The above description of the operation of the circuit of Fig. 1 has not included any reference to phase shifter 32. It can be assumed, so far as the description so far given is concerned either that no phase shift was introduced into the signal in which case the output signal corresponds to the component of the signal energy at terminal 4 which is in phase, or 180° out of phase, with the signal voltage or that device 32 has introduced a definite phase shift, in which case the output signal corresponds to the component of the signal when applied to the grid of tube 28 that is in phase, or 180° out of phase, with the reference voltage. In either case, having obtained an output signal corresponding to one component of the input signal, phase shifter 32 can be adjusted to change the phase of the signal applied to the control grid 30 by 90°. The output at terminal 42 will then correspond with the other rectangular component of the input signal and hence a complete analysis of the input signal may be obtained. By suitable adjustment of phase shifter 32, the amplitude and relative polarity of any component of the input signal can be determined, as in each case that component of the output from the phase shifter that is in phase with, or in phase opposition to, the reference voltage, will yield a corresponding output signal.

Instead of determining separate components of this signal sequentially by adjustment of a phase shifting device as above described, two or more mixers, could be provided for simultaneous determination of different components of the input signal: such an arrangement is illustrated in Fig. 2 wherein the circuit is arranged to analyze an unknown impedance network.

In Fig. 2, a radio frequency oscillator 48 is connected to an impedance network 50 the character of which is to be analyzed and to the balanced modulator of the discriminator. Two mixer tubes 28*a* and 28*b* are provided so that two components of the output from network 50 can be simultaneously metered. Control grids 26*a* and 26*b* of the mixer tubes are connected through a common lead 52 with the junction of condensers 22 and 24 of the modulator output circuit, and the other control grids 30*a* and 30*b* of the mixer tubes are separately connected to the output terminal network 50. A 90° phase shift network 54 is connected between network 50 and grid 30*a*. Connected to the output terminals 42*a* and 42*b* are phase sensitive low frequency voltmeters 56*a* and 56*b* respectively.

The operation of the circuit of Fig. 2 will be clear from the description already given of the operation of the circuit of Fig. 1. Voltmeter 56*a* will indicate the amplitude and polarity of one rectangular component of the output from network 50 and voltmeter 56*b* will indicate the amplitude and polarity of the other rectangular component of the output from network 50. Thus the circuit provides a means for ready determination of the complex attenuation of the network.

The phase discriminator of the invention has now been described with reference to one embodiment thereof and with reference to a specific application thereof as an analyzer of an unknown network. Obviously various changes in the specific circuits of the drawing could be made without departing from the spirit of the invention and various other fields of use of the discriminator will occur to those skilled in the art. For example, control motors or other regulating devices for elements of the unknown network could be substituted for, or used in conjunction with, the indicating devices of Fig. 2. Also additional mixers for the signal energy and modulator output could be provided if desired.

Although a low frequency alternating current output signal would ordinarily be preferred, a direct current output signal can be readily obtained, if desired, as it is only necessary to connect a low frequency phase discriminator to the output terminal of the high frequency discriminator of the invention as will be obvious to those skilled in the art.

From the above description it will be apparent that the invention provides a phase discriminator for high frequency currents that, as compared to discriminators heretofore in use, does not require as much delicate adjustment, has less undesirable interaction between the parts and which delivers a more convenient type of output signal, namely a low frequency alternating signal suitable for control operations.

The following is claimed:

1. The method of obtaining two low frequency output signals each varying in amplitude with the amplitude of a different rectangular component of a high frequency input signal which comprises modulating energy of the frequency of the input signal with energy of the frequency of that desired for the output signal, mixing side bands of the modulated energy with the input signal energy and suppressing from the mixed energy the component having twice the frequency of the modulating energy, whereby the remaining low frequency component of the mixed energy varies in amplitude with one component of the signal energy, shifting the phase of the high frequency input signal energy through 90° and mixing with the side bands to obtain a second low frequency output signal varying in amplitude with the other rectangular component of the high frequency input signal energy.

2. A phase discriminator comprising in combination a balanced modulator for modulating high frequency energy with low frequency energy and delivering energy of frequencies which are the sum and difference of the high and low frequencies, first means for mixing the output from said modulator with signal energy of the same high frequency as that modulated in said modulator, a second means for mixing the modulator output with the signal energy, means for separately shifting the phase of the signal energy delivered to each of said mixing means and output circuits connected to said mixers responsive to energy of the frequency of the modulating energy.

3. A phase discriminator comprising in combination a circuit having an input terminal for a high frequency signal to be analyzed and an input terminal for reference energy of the same frequency as that of the signal, said circuit including a balanced modulator connected to said second input terminal for modulating the reference energy with low frequency energy, a mixer connected to said first terminal and to said balanced modulator and an output circuit for said mixer responsive to energy of the frequency of the modulating energy, said balanced modulator comprising a pair of tubes each having an anode, a cathode and a control grid, the reference energy being impressed across said control grids, said cathodes being interconnected by a resistor across which the modulating energy is impressed and said anodes being tied together and coupled to said mixer through a resonant circuit for delivery of the side bands of the modulated energy thereto.

4. A phase discriminator comprising in combination a circuit having an input terminal for a high frequency signal to be analyzed and an input terminal for reference energy of the same frequency as that of the signal, said circuit including a balanced modulator connected to said second input terminal for modulating the reference energy with low frequency energy, a mixer connected to said first terminal and to said balanced modulator and an output circuit for said mixer responsive to energy of the frequency of the modulating energy, said output circuit including a filter tuned for maximum impedance at the frequency of the modulating energy whereby the voltage across said filter varies with the intensity of the component of the signal in phase with, or in phase opposition to, the reference energy.

5. An impedance analyzer comprising in combination, an impedance network having input and output terminals, a source of high frequency energy connected to the input terminals of said network, a balanced modulator connected to said source for modulating the energy therefrom with low frequency energy, a mixer connected to the output terminal of said network and to the modulator for mixing the side bands of the modulated energy with the high frequency signal from said network, an output circuit connected to said mixer responsive to energy of the low frequency of the modulating energy, a second mixer connected to the output terminals of said network and to said modulator for mixing the side bands of the modulated energy with the high frequency signal from said network, an output circuit connected to said last mentioned mixer responsive to energy of the low frequency of the modulating energy and means for shifting the phase of the signal energy applied to at least one of said mixers whereby the output circuits respond to different components of the signal energy.

6. An impedance analyzer comprising in combination, an impedance network having input and output terminals, a source of high frequency energy connected to the input terminals of said network, a balanced modulator connected to said source for modulating the energy therefrom with low frequency energy, a mixer connected to the output terminal of said network and to the modulator for mixing the side bands of the modulated energy with the high frequency signal from said network and an output circuit connected to said mixer responsive to energy of the low frequency of the modulating energy, said mixer comprising a double triode, one control grid of which is connected to the modulator and the other control grid of which is connected to the output terminal of said network, said output circuit being connected to the cathodes of the double triode and including a filter tuned for maximum impedance at the frequency of the modulating energy and a phase responsive low frequency meter shunting said filter.

7. A phase discriminator comprising in combination an input terminal for a high frequency signal to be analyzed, a source of high frequency energy of a frequency equal to that of the signal, means for modulating energy from said source with low frequency energy, means for additively combining said modulated energy from said source with said high frequency signal, means linearly responsive to the modulated frequency component of the envelope of the combined wave for creating a low frequency output signal of the frequency of the modulating energy and of amplitude of the component of the signal energy in phase with or in phase opposition to the energy of said source, means for shifting the phase of the input signal energy through 90°, means for also additively combining said modulated energy from said source with said high frequency signal after phase shift, and means linearly responsive to the modulating frequency component of the envelope of the combined wave after phase shift for creating a second low frequency output signal of the frequency of the modulating energy and having an amplitude proportional to the amplitude of the other rectangular component of the signal energy.

ROBERT M. BRINK.

REFERENCES CITED

The following references are of record in the file of this patent:

UNITED STATES PATENTS

| Number | Name | Date |
|---|---|---|
| 1,926,875 | Llewellyn | Sept. 12, 1933 |
| 1,984,156 | Purington | Dec. 11, 1934 |
| 2,285,038 | Loughlin | June 2, 1942 |
| 2,333,322 | Levy | Nov. 2, 1943 |
| 2,377,326 | Crosby | June 5, 1945 |
| 2,416,310 | Hansen et al. | Feb. 25, 1947 |
| 2,429,216 | Bollman | Oct. 21, 1947 |
| 2,438,288 | Jacobson et al. | Mar. 23, 1948 |
| 2,440,261 | Ginzton | Apr. 27, 1948 |
| 2,546,407 | Rich | Mar. 27, 1951 |